US012489190B2

(12) United States Patent
Zhang et al.

(10) Patent No.: US 12,489,190 B2
(45) Date of Patent: Dec. 2, 2025

(54) COUPLER FOR COMMUNICATION SYSTEM

(71) Applicant: Outdoor Wireless Networks LLC, Claremont, NC (US)

(72) Inventors: Ting Zhang, Suzhou (CN); Fangwen Wan, Suzhou (CN); Zhiwei Yin, Suzhou (CN); Haiyan Chen, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 140 days.

(21) Appl. No.: 18/530,271

(22) Filed: Dec. 6, 2023

(65) Prior Publication Data

US 2024/0195039 A1 Jun. 13, 2024

(30) Foreign Application Priority Data

Dec. 7, 2022 (CN) ......................... 202211560440.3

(51) Int. Cl.
*H01P 5/12* (2006.01)
*H01P 3/08* (2006.01)

(52) U.S. Cl.
CPC . *H01P 5/12* (2013.01); *H01P 3/08* (2013.01)

(58) Field of Classification Search
CPC .. H01P 5/12; H01P 5/028; H01P 5/185; H01P 5/187; H01P 5/184; H01P 3/08
See application file for complete search history.

(56) References Cited

U.S. PATENT DOCUMENTS

2018/0083336 A1* 3/2018 Weale ..................... H01P 5/187

FOREIGN PATENT DOCUMENTS

| | | | | |
|---|---|---|---|---|
| CN | 219937346 U | * 10/2023 | | |
| CN | 117525794 A | * 2/2024 | ................ | H01P 5/12 |
| EP | 3734751 A1 | * 11/2020 | .............. | H01P 5/184 |
| WO | WO-2024124984 A1 | * 6/2024 | ................ | H01P 5/18 |

* cited by examiner

*Primary Examiner* — Andrea Lindgren Baltzell
*Assistant Examiner* — Kimberly E Glenn
(74) *Attorney, Agent, or Firm* — Myers Bigel, P.A.

(57) ABSTRACT

A coupler for a communication system, including: a first conductive trace including a first coupling section; a second conductive trace including a second coupling section configured to be adjacent to and spaced from the first coupling section to be galvanically isolated from and coupled to the first coupling section; and a first intermediate conductor provided between and spaced from the first coupling section and the second coupling section to be galvanically isolated from and coupled to both the first coupling section and the second coupling section, where an edge of the first coupling section adjacent to the second coupling section has a first recess, and the first intermediate conductor is provided at the first recess.

20 Claims, 9 Drawing Sheets

COUPLER FOR COMMUNICATION SYSTEM

CROSS-REFERENCE TO RELATED APPLICATION

The present application claims the benefit of priority to Chinese Patent Application No. 202211560440.3, filed on Dec. 7, 2022, and the entire contents of the above-identified application are incorporated by reference as if set forth herein.

TECHNICAL FIELD

The present disclosure relates to a communication system, and more particularly, a coupler suitable for use in a communication system.

BACKGROUND

Couplers are widely used in the radio communication industry. The coupler may, for example, have an input port, an output port, and a coupling port. The coupler may be configured to pass a first portion of a radio frequency (RF) signal input from the input port to the output port and couple a second portion of the RF signal to the coupling port.

SUMMARY

One object of the present disclosure is to provide a coupler suitable for use in a communication system.

According to a first aspect of the present disclosure, a coupler is provided, including: a first conductive trace including a first coupling section; a second conductive trace including a second coupling section configured to be adjacent to and spaced from the first coupling section to be galvanically isolated from and coupled to the first coupling section; and a first intermediate conductor provided between and spaced from the first coupling section and the second coupling section to be galvanically isolated from and coupled to both the first coupling section and the second coupling section, where an edge of the first coupling section adjacent to the second coupling section has a first recess, and the first intermediate conductor is provided at the first recess.

According to a second aspect of the present disclosure, a coupler is provided, including: a first conductive trace including a first coupling section; a second conductive trace including a second coupling section configured to be adjacent to and spaced from the first coupling section to be galvanically isolated from and coupled to the first coupling section; and a first intermediate conductor provided between and spaced from the first coupling section and the second coupling section to be galvanically isolated from and coupled to both the first coupling section and the second coupling section, where the first coupling section has a first perturbation structure configured to slow down a phase speed of an electromagnetic wave transmitted in the first conductive trace, and to slow down the phase speed more when the first conductive trace and the second conductive trace receive odd-mode excitation than when the first conductive trace and the second conductive trace receive even-mode excitation; and the first intermediate conductor is provided between the first perturbation structure and the second coupling section.

Through the following detailed description of exemplary embodiments of the present disclosure by referencing the attached drawings, other features and advantages of the present disclosure will become clear.

BRIEF DESCRIPTION OF DRAWINGS

The attached drawings, which form a part of the specification, describe embodiments of the present disclosure and, together with the specification, are used to explain the principles of the present disclosure.

Figure 1:
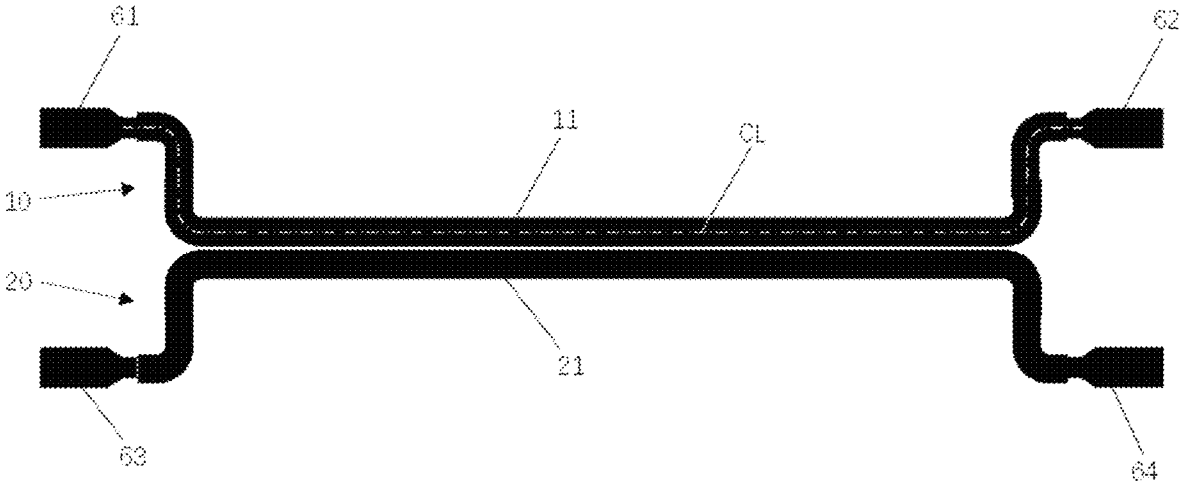
FIG. 1 is a schematic plan view of a conventional coupler.

Note, in the embodiments described below, the same reference signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like sometimes may not indicate the actual position, dimension, and range. Therefore, the present disclosure is not limited to the positions, dimensions, and ranges disclosed in the attached drawings and the like.

DETAILED DESCRIPTION

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that the terms used herein are only used to describe specific embodiments, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, or "directly in contact with" another element, there will be no intermediate elements. As used herein, when one feature is arranged "adjacent" to another feature, it may mean that one feature has a part overlapping with the adjacent feature or a part located above or below the adjacent feature.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features". The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "exemplary" means "serving as an example, instance or explanation", not as a "model" to be accurately copied. Any realization method described exemplarily herein may not be necessarily interpreted as being preferable or advantageous over other realization methods. Furthermore, the present disclosure is not limited by any expressed or implied theory given in the above technical field, background art, summary of the invention or embodiments.

As used herein, the word "basically" means including any minor changes caused by design or manufacturing defects, device or component tolerances, environmental influences, and/or other factors. The word "basically" also allows for the divergence from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

Figure 2:
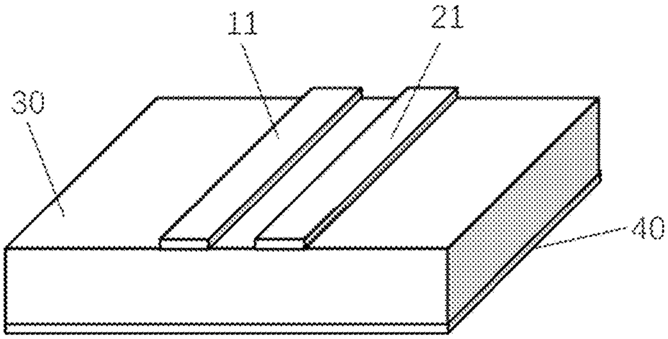
FIG. 2 is a schematic perspective view of at least part of a coupling section of the coupler of FIG. 1.
Figure 3A:
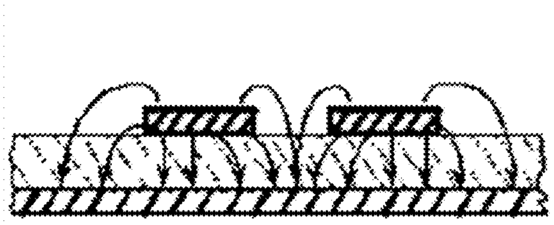
FIGS. 3A and 3B are schematic diagrams of power line distribution at one cross-section of the coupling section of the coupler of FIG. 1.
Figure 3B:
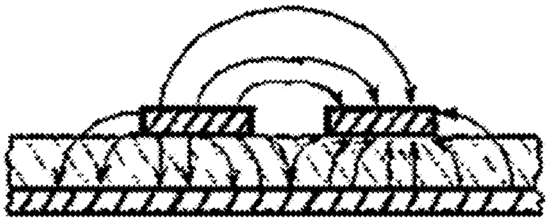

The structure and performance of a conventional coupler will be described below with reference to FIGS. 1, 2, 3A, and 3B. FIG. 1 is a schematic plan view of a conventional coupler. FIG. 2 is a schematic perspective view of at least part of a coupling section of the coupler of FIG. 1. FIG. 3A and FIG. 3B are schematic diagrams of power line distribution at one cross-section of the coupling section of FIG. 2 in cases of even-mode excitation and odd-mode excitation, respectively. It should be understood that, in order to briefly illustrate principles related to the coupler of the embodiment of the present disclosure, FIG. 2 only shows at least part of the coupling section when the coupler of FIG. 1 is a microstrip line coupler, and FIG. 3A and FIG. 3B only show power line distribution at one cross-section of the coupling section of FIG. 2.

The coupler generally includes two conductive traces 10 and 20, the conductive traces 10 and 20 have their own coupling sections 11 and 21, and the conductive traces 10 and 20 are configured (e.g., spaced from each other) such that the coupling sections 11 and 21 are galvanically isolated from and coupled to each other. When the coupler is a microstrip line coupler, the conductive traces 10 and 20 are configured such that opposite edges of the coupling sections 11 and 21 are adjacent to each other and extend parallel to each other in a spaced manner, thereby forming a coupling between the coupling sections 11 and 21.

When the coupler is a microstrip line coupler, the conductive traces 10 and 20 are strip conductors in a microstrip transmission line, for example, strip conductive traces formed on an upper surface of a dielectric substrate 30. It should be understood that the microstrip transmission line further includes a ground member 40 formed on a lower surface of the dielectric substrate 30. For example, the microstrip line coupler may be implemented on a printed circuit board including the dielectric substrate 30. Various traces, such as those shown in FIG. 1, may be implemented as metal patterns formed on an upper surface of the printed circuit board. The ground member 40 may be implemented by forming a metal sheet on a lower surface of the printed circuit board located below the metal pattern. For the sake of brevity, FIGS. 1 and 4-8, which are used to depict the structure of the coupler according to some embodiments of the present disclosure, only show at least part of the strip conductive trace of the microstrip line coupler that is formed on the upper surface of the dielectric substrate 30.

The coupler may include four ports 61-64. A first end of the conductive trace 10 is coupled to the port 61 and a second end thereof is coupled to the port 62. A first end of the conductive trace 20 is coupled to the port 63 and a second end thereof is coupled to the port 64. Any one of the ports 61, 62, 63 and 64 may be used as an input port of the coupler. In an example, port 61 may be used as an input port of the coupler. In this case, the port 62 is an output port of the coupler, the port 63 is a coupling port, and the port 64 is an isolation port. When an input signal is passed to the conductive trace 10 through the port 61 (input port), a first portion of energy of the input signal is passed from the port 61 to the port 62 (output port), and a second portion of the energy of the input signal is coupled to the conductive trace 20. Ideally, the second portion of the energy of the input signal is completely passed to the port 63 (coupling port), while the port 64 (isolation port) does not have an energy output. In this ideal case, the port 61 and the port 64 are completely isolated, and the coupler has desirable directionality.

However, in an actual coupler, the port 61 and the port 64 are not completely isolated, and the coupler has a worse directionality than the ideal case. Some of the energy in the second portion of the energy of the input signal passed on the conductive trace 20 may be transferred to the port 63 (coupling port) while the remaining energy is transferred to the port 64 (isolation port). Where the coupler is a microstrip line coupler, one reason for worsening of the directionality of the coupler may be a difference in a phase speed of the coupler when receiving odd-mode excitation (also referred to herein as "an odd-mode phase speed") and a phase speed of the coupler when receiving even-mode excitation (also referred to herein as "an even-mode phase speed").

When even-mode excitation is applied to the coupler, that is, when the two conductive traces 10 and 20 of the coupler are respectively applied with a pair of symmetrical signals (for example, two identical voltages) respectively, in the case of microstrip lines, the two conductive traces 10 and 20 have an equal number of charge distribution with the same symbol, so their power lines constitute even symmetric distribution that is mutually exclusive, as shown in FIG. 3A. When odd-mode excitation is applied to the coupler, that is, when the two conductive traces 10 and 20 of the coupler are applied with a pair of antisymmetric signals (for example, two voltages with an equal amplitude and opposite phases) respectively, in the case of microstrip lines, the two conductive traces 10 and 20 have an equal number of charge distribution with opposite symbols, so their power lines constitute odd symmetric distribution that is mutually attracted, as shown in FIG. 3B. The microstrip line coupler has more power lines distributed in an air dielectric (which has a smaller dielectric constant than a dielectric substrate 30 underneath the first and second conductive traces 10 and 20) in an electric field when receiving odd-mode excitation than those in an electric field when receiving even-mode excitation, so the odd-mode phase speed of the microstrip line coupler is greater than the even-mode phase speed.

According to the coupler of the embodiment of the present disclosure, a perturbation structure is provided on at least a first coupling section of first and second coupling sections that are coupled to each other. The perturbation structure may slow down a phase speed of an electromagnetic wave transmitted on the first coupling section, and a slowing of the odd-mode phase speed may be greater than a slowing of the even-mode phase speed. This may reduce a difference between the odd-mode phase speed and the even-mode phase speed and thereby improve the directionality of the coupler. In addition, an intermediate conductor coupled to both the first coupling section and the second coupling section may be provided between the perturbation structure and the second coupling section, which may increase mutual capacitance between the two conductive traces, thereby further slowing down the odd-mode phase speed. This may further reduce the difference between the odd-mode phase speed and the even-mode phase speed, and may improve the directionality of the coupler. In some embodiments, the perturbation structure may include at least one recess provided at an edge of the first coupling section adjacent to the second coupling section, and the intermediate conductor may be provided in the at least one recess.

The structure of the coupler according to the embodiment of the present disclosure will be described below with reference to FIGS. 4 to 8. It should be understood that, in order to clearly illustrate the structure related to the inventive point of the present disclosure, FIGS. 4 to 8 only show a portion of respective coupling sections 51 and 52 of the two conductive traces of the coupler according to some embodiments of the present disclosure in the form of a simplified plan view. It is expected that those skilled in the art can obtain a complete structure of the coupler according to these embodiments of the present disclosure in connection with FIGS. 1 and 2. For example, although the overall structure is not shown, it should be understood that the coupler of the embodiment shown in FIG. 4 may have a structure similar to the conventional coupler as shown in FIG. 1, except for differences described herein.

Figure 4:
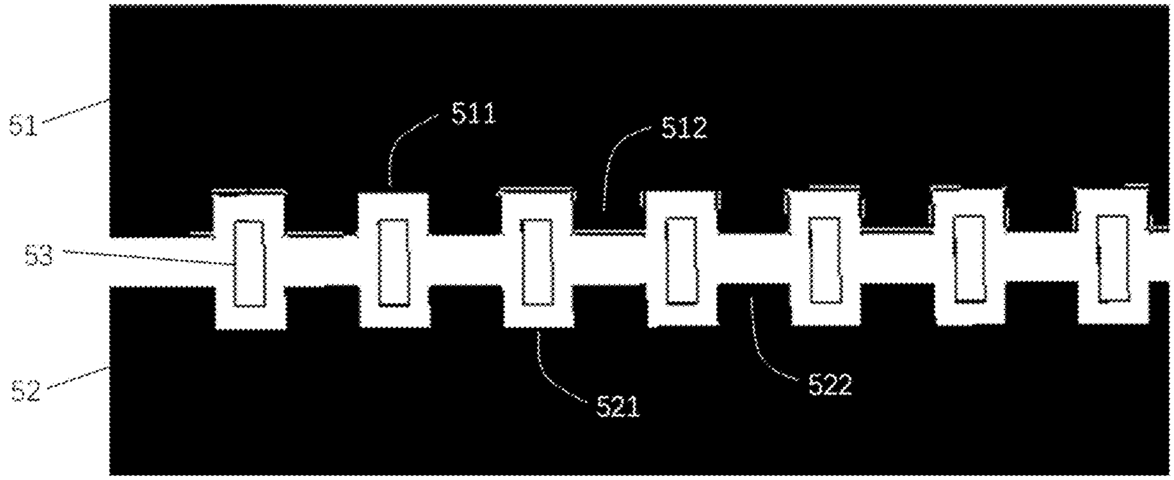
FIGS. 4 to 8 are schematic plan views of at least part of a coupling section of a coupler according to an embodiment of the present disclosure.

In the embodiment shown in FIG. 4, the perturbation structure may be provided on the coupling section of each of the two conductive traces of the coupler, and the intermediate conductor may be provided between the perturbation structures on the coupling sections of the two conductive traces.

In these embodiments, the coupler may include a first conductive trace and a second conductive trace. As shown in FIG. 4, the first conductive trace includes a first coupling section 51, and the second conductive trace includes a second coupling section 52. The first coupling section 51 may be adjacent to and spaced from the second coupling section 52, such that the first coupling section 51 and the second coupling section 52 are galvanically isolated from and coupled to each other. The first coupling section 51 may have a first perturbation structure and the second coupling section 52 may have a second perturbation structure. The first perturbation structure may be provided at an edge of the first coupling section 51 that is adjacent to the second coupling section 52. The second perturbation structure may be provided at an edge of the second coupling section 52 that is adjacent to the first coupling section 51. The first perturbation structure may include one or more first recesses 511. The first recess 511 may be recessed from the edge of the first coupling section 51 adjacent to the second coupling section 52 toward or to a center line of the first conductive trace (for example, to or toward the center line (CL) of the first conductive trace 10 in FIG. 1). The second perturbation structure may include one or more second recesses 521. The second recess 521 may be recessed from an edge of the second coupling section 52 adjacent to the first coupling section 51 toward or to a center line of the second conductive trace.

FIG. 4 illustrates a case in which the first perturbation structure includes a plurality of first recesses 511 and the second perturbation structure includes a plurality of second recesses 521. For ease of description, portions of the first coupling section 51 that are located next to the first recesses 511 and extend to the edge of the first coupling section 51 are referred to herein as first protrusions 512. Portions of the second coupling section 52 that are located next to the second recesses 521 and extend to the edge of the second coupling section 52 are referred to as second protrusions 522. Therefore, in some embodiments and as shown in FIG. 4, the first perturbation structure may also be described as including a plurality of first recesses 511 and a plurality of first protrusions 512 that are alternately continuous and extend along the edge of the first coupling section 51 adjacent to the second coupling section 52. The second perturbation structure may also be described as including a plurality of second recesses 521 and a plurality of second protrusions 522 that are alternately continuous and extend along the edge of the second coupling section 52 adjacent to the first coupling section 51. The plurality of first recesses 511 of the first perturbation structure may be aligned with the plurality of second recesses 521 of the second perturbation structure across a gap or space between the first coupling section 51 and the second coupling section 52, and the plurality of first protrusions 512 may be aligned with the plurality of second protrusions 522 across the gap between the first coupling section 51 and the second coupling section 52.

The first perturbation structure may be configured to slow down the phase speed of a first electromagnetic wave or first radiofrequency (RF) signal transmitted in the first conductive trace, and to slow down a phase speed of the first electromagnetic wave or first RF signal by a greater amount when the first and second conductive traces of the coupler receive odd-mode excitation than when the first and second conductive traces receive even-mode excitation. The second perturbation structure may be configured to slow down the phase speed of a second electromagnetic wave or second RF signal transmitted in the second conductive trace, and to slow down a phase speed of the second electromagnetic wave or second RF signal by a greater amount when the first and second conductive traces of the coupler receive odd-mode excitation than when the first and second conductive traces receive even-mode excitation. In other words, as compared with the conventional coupler shown in FIG. 1, the first and second perturbation structures of FIG. 4 may slow odd-mode phase speeds by a greater amount than even-mode phase speeds, thereby reducing the difference between the odd-mode phase speeds and the even-mode phase speeds. Accordingly, the coupler of FIG. 4 with the first and second perturbation structures may have better directionality than the conventional coupler of FIG. 1.

In addition, the coupler according to the embodiment shown in FIG. 4 further includes one or more intermediate conductors 53. Each intermediate conductor 53 may be provided between the first perturbation structure of the first coupling section 51 and the second perturbation structure of the second coupling section 52, and may be spaced apart from both the first coupling section 51 and the second coupling section 52 such that the intermediate conductors 53 are galvanically isolated from and coupled to both the first coupling section 51 and the second coupling section 52. There may be a plurality of first intermediate conductors 53, and each intermediate conductor 53 of the plurality of intermediate conductors 53 may be provided at or at least partially within a respective first recess 511 of the plurality of first recesses 511 and a respective second recess 521 of the plurality of second recesses 521. For example, a first intermediate conductors 53 may have a shape that fits within both a corresponding first recess 511 and a corresponding second recess 521, and the first intermediate conductors 53 may extend into the corresponding first recess 511 in a first direction and into the corresponding second recess 521 in a second direction opposite the first direction from the gap between the first coupling section 51 and the second coupling section 52, so as to be provided at least partially within both the corresponding first recess 511 and the corresponding second recess 521. A distance between the first intermediate conductor 53 and the first coupling section 51 may be not greater than (for example, may be less than) a distance between the first protrusion 512 and the second protrusion 522. A distance between the first intermediate conductor 53 and the second coupling section 52 may be not greater than (e.g., may be less than) the distance between the first protrusion 512 and the second protrusion 522.

Figure 12:
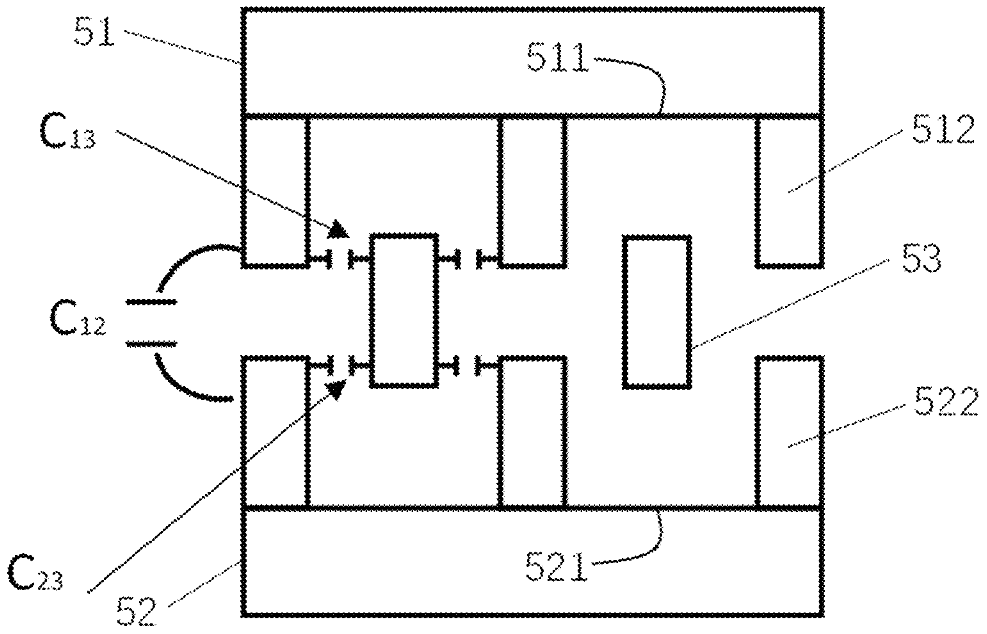
FIG. 12 is a schematic diagram illustrating mutual capacitance of a coupler according to an embodiment of the present disclosure.

The arrangement of the intermediate conductors 53 may increase a mutual capacitance between the two conductive traces. FIG. 12 is a schematic diagram illustrating the mutual capacitance of the coupler according to the embodiment shown in FIG. 4. $C_{12}$ represents mutual capacitance between the first coupling section 51 and the second coupling section 52, $C_{13}$ represents mutual capacitance between the first coupling section 51 and the first intermediate conductor 53, and $C_{23}$ represents mutual capacitance between the second coupling section 52 and the first intermediate conductor 53. It may be seen that, as compared with the conventional coupler shown in FIG. 1, a total mutual capacitance of the coupler added with the intermediate conductors 53 according to the embodiment shown in FIG. 4 may be increased significantly. Therefore, a coupler as shown in FIG. 4, that is with the perturbation structures and the intermediate conductors 53, may be configured to reduce a difference between the odd-mode phase speed and the even-mode phase speed by a greater amount than a coupler with the perturbation structure alone, so that the directionality of the coupler can be further improved.

Figure 9A:
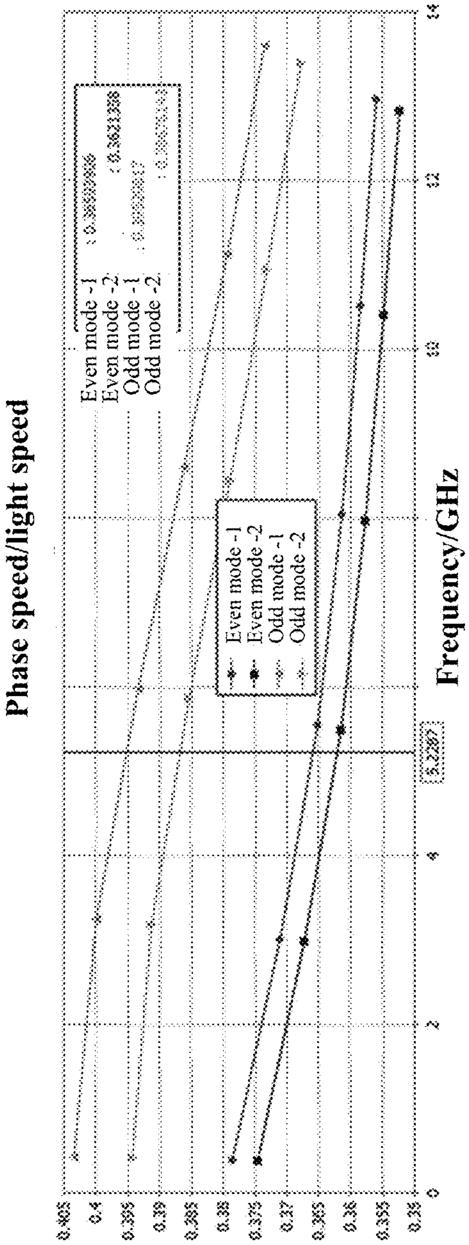
FIG. 9A is a graph of changes of a phase speed of a conventional coupler and a phase speed of a coupler with only a perturbation structure with frequency.
Figure 9B:
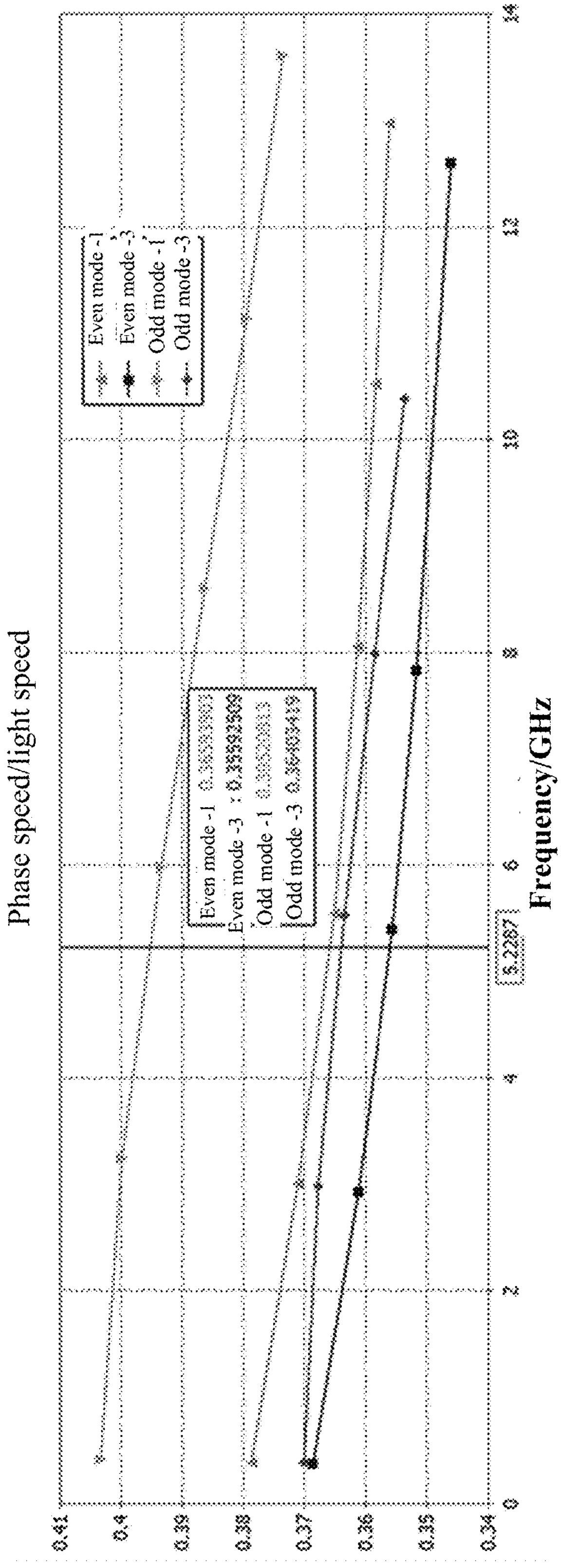
FIG. 9B is a graph of changes of a phase speed of a conventional coupler and a phase speed of a coupler according to an embodiment of the present disclosure with frequency.

FIG. 9A is a graph of the phase speed of the conventional coupler shown in FIG. 1 (the ratio of a propagation speed of the electromagnetic wave in the microstrip line coupler to a propagation speed of the electromagnetic wave in vacuum ("light speed")), and the phase speed of a coupler provided with the perturbation structure but without the intermediate conductors (i.e., the coupler shown in FIG. 4 with each intermediate conductor 53 removed, which may be referred to herein as a "coupler with only the perturbation structure"), plotted for various frequencies. FIG. 9B is a graph of the phase speed of the conventional coupler shown in FIG. 1 and the phase speed of the coupler shown in FIG. 4 (i.e., with the plurality of intermediate couplers 53), plotted for the same frequencies as FIG. 9A. The label "even mode-1" indicates the even-mode phase speed of the conventional coupler, "even mode-2" indicates the even-mode phase speed of the coupler having only the perturbation structure, "even mode-3" indicates the even-mode phase speed of the coupler shown in FIG. 4, "odd mode-1" indicates the odd-mode phase speed of the conventional coupler, "odd mode-2" indicates the odd-mode phase speed of the coupler having only the perturbation structure, and "odd mode-3" indicates the odd-mode phase speed of the coupler shown in FIG. 4.

As shown in FIG. 9A and FIG. 9B, at a frequency of 5.2287 GHZ, the even-mode phase speed of the conventional coupler ("even-mode-1") is about 0.366 times the light speed, the even-mode phase speed of the coupler having only the perturbation structure ("even-mode-2") is about 0.362 times the light speed, and the even-mode phase speed of the coupler shown in FIG. 4 ("even-mode-3") is about 0.356 times the light speed. The odd-mode phase speed of the conventional coupler ("odd-mode-1") is about 0.395 times the light speed, the odd-mode phase speed of the coupler having only the perturbation structure ("odd-mode-2") is about 0.387 times the light speed, and the odd-mode phase speed of the coupler shown in FIG. 4 ("odd-mode-3") is about 0.364 times the light speed. It can be seen that in the conventional coupler, the difference between the odd-mode phase speed and the even-mode phase speed is about 0.029 times the light speed (0.395-0.366). As compared to the conventional coupler, the coupler having only the perturbation structure can reduce the even-mode phase speed by about 0.004 times the light speed (0.366-0.362) and the odd-mode phase speed by about 0.008 times the light speed (0.395-0.387). In the coupler having only the perturbation structure, the difference between the odd-mode phase speed and the even-mode phase speed is about 0.025 times the light speed (0.387-0.362). Compared to the conventional coupler, the coupler shown in FIG. 4 can reduce the even-mode phase speed by about 0.010 times the light speed (0.366-0.356) and the odd-mode phase speed by about 0.031 times the light speed (0.395-0.364). In the coupler shown in FIG. 4, the difference between the odd-mode phase speed and the even-mode phase speed is about 0.008 times the light speed (0.364-0.356).

It can be seen that compared with the conventional coupler shown in FIG. 1, the coupler having only the perturbation structure and the coupler shown in FIG. 4 can slow down the odd-mode phase speed more than the even-mode phase speed, thereby reducing the difference between the odd-mode phase speed and the even-mode phase speed. Accordingly, the coupler shown in FIG. 4 has a better effect than the coupler having only the perturbation structure, and can significantly reduce the difference between the odd-mode phase speed and the even-mode phase speed, so that the odd-mode phase speed and the even-mode phase speed in the coupler shown in FIG. 4 are closer than in the comparative examples.

Figure 10:
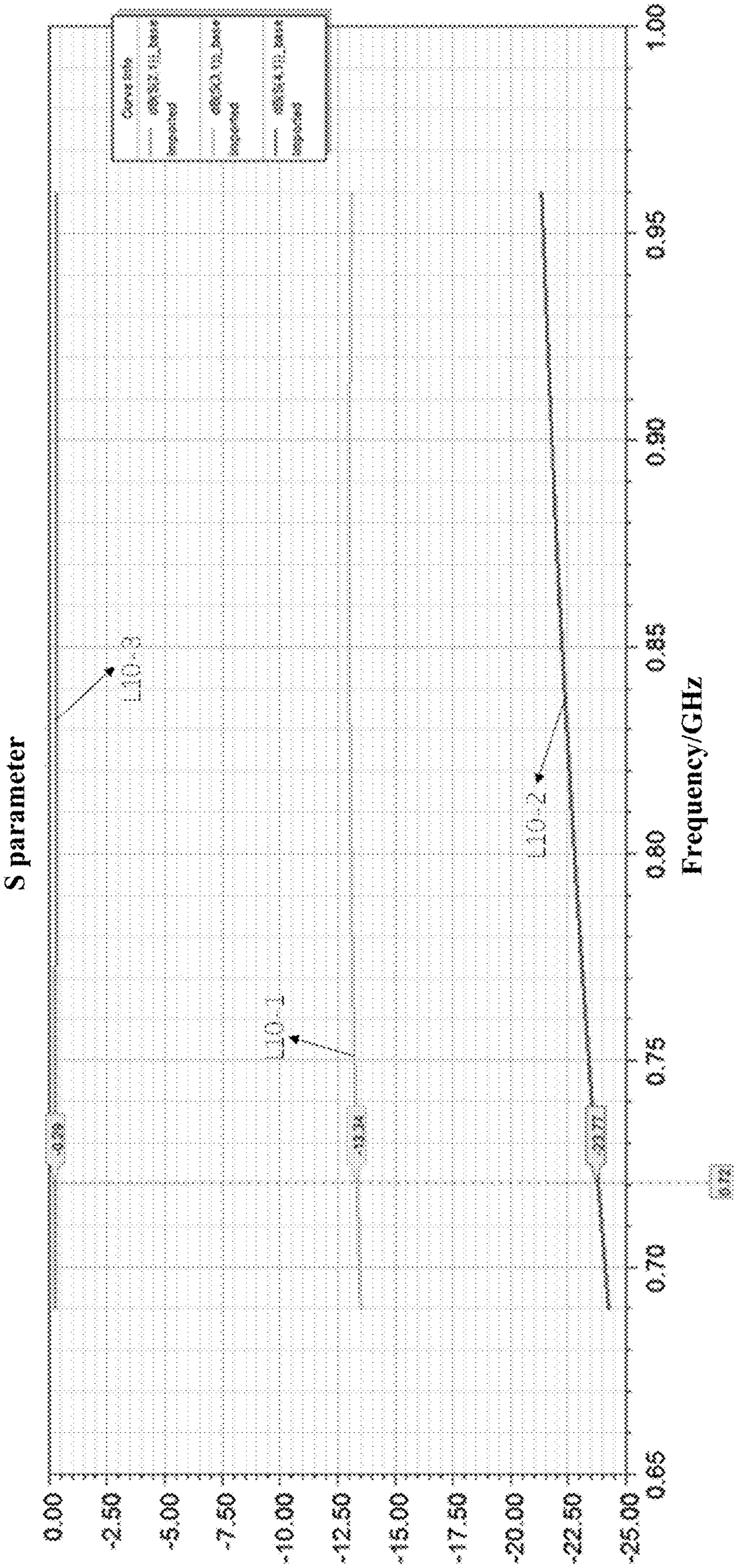
FIG. 10 is a graph of a change of an S-parameter of a conventional coupler with frequency.

FIG. 10 is a graph of an S-parameter of the conventional coupler shown in FIG. 1, plotted for various frequencies. Curve L10-3 represents a change of the ratio of signal power through the output port (e.g., the port 62) of the coupler to signal power input from the input port (e.g., the port 61) with frequency (unit dB, hereinafter referred to as a parameter S21), curve L10-1 represents a change of the ratio of signal power through the coupling port (e.g., the port 63) to the signal power input from the input port (unit dB, hereinafter referred to as a parameter S31) with frequency, and curve L10-2 represents a change of the ratio of signal power through the isolation port (e.g., the port 64) to the signal power input from the input port (unit dB, hereinafter referred to as a parameter S41) with frequency.

Figure 11:
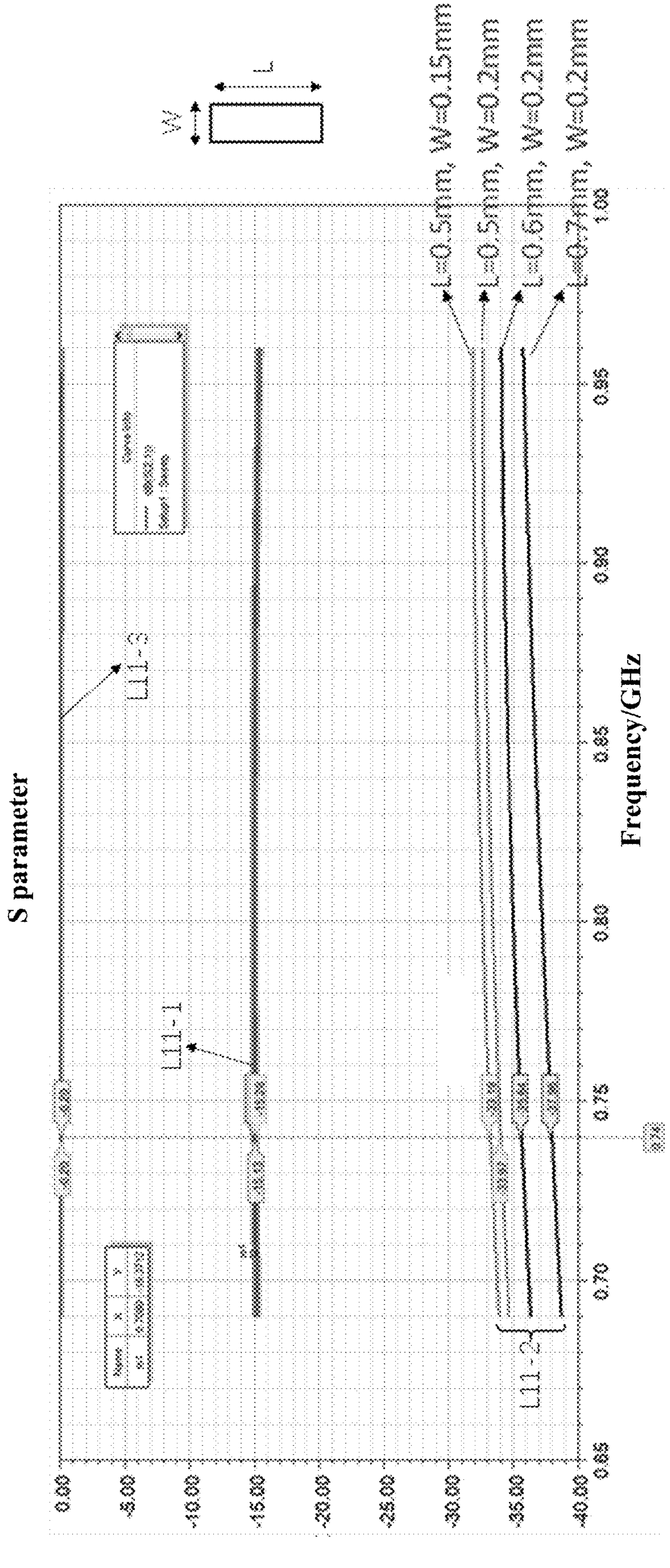
FIG. 11 is a graph of a change of an S parameter of a coupler according to an embodiment of the present disclosure with frequency.

FIG. 11 is a graph of an S parameter of the coupler according to the embodiment shown in FIG. 4, plotted for the same frequencies as shown in FIG. 10. Curve group L11-3 represents a change of the parameter S21 of the coupler shown in FIG. 4 with frequency, curve group L11-1 represents the change of the parameter S31 with frequency, and curve group L11-2 represents a change of S41 with frequency. FIG. 11 simulates four parameters of the intermediate conductor, represented by four curves in each curve group. Four parameter cases are shown in FIG. 11, corresponding to four different combinations of dimensions of length L and width W of the intermediate conductors 53.

As can be seen from FIG. 10, for the conventional coupler shown in FIG. 1, at a frequency of 0.72 GHz, the parameter S21 is about −0.29 dB, the parameter S31 is about −13.34 dB, and the parameter S41 is about −23.77 dB. As can be seen from FIG. 11, for the coupler shown in FIG. 4, at a frequency of 0.74 GHz, the parameter S21 is about −0.20 dB, the parameter S31 is about −15.13 dB to −15.28 dB, and the parameter S41 is about −33.19 dB to −37.96 dB. It can be seen that the coupler with the added perturbation structure and intermediate conductor has a slightly lower coupling degree (about 2 dB lower) than the conventional coupler, but its isolation degree has significantly improved (about 10 dB to 14 dB improved) than the isolation degree of the conventional coupler. That is, the coupler according to the embodiment of the present disclosure may exhibit better directionality than the conventional coupler, and there is an exhibited improvement in directionality of the coupler when a size (e.g., area) of the intermediate conductor is increased.

In some embodiments, the perturbation structure may be provided only on the coupling section of the first conductive trace of the two conductive traces of the coupler, while no perturbation structure is provided on the coupling section of the second conductive trace of the two conductive traces. The intermediate conductors may be provided between the perturbation structure on the coupling section of the first conductive trace and the coupling section of the second conductive trace. In the description below, the description of content same or similar to the embodiments described above will be omitted.

Figure 5:
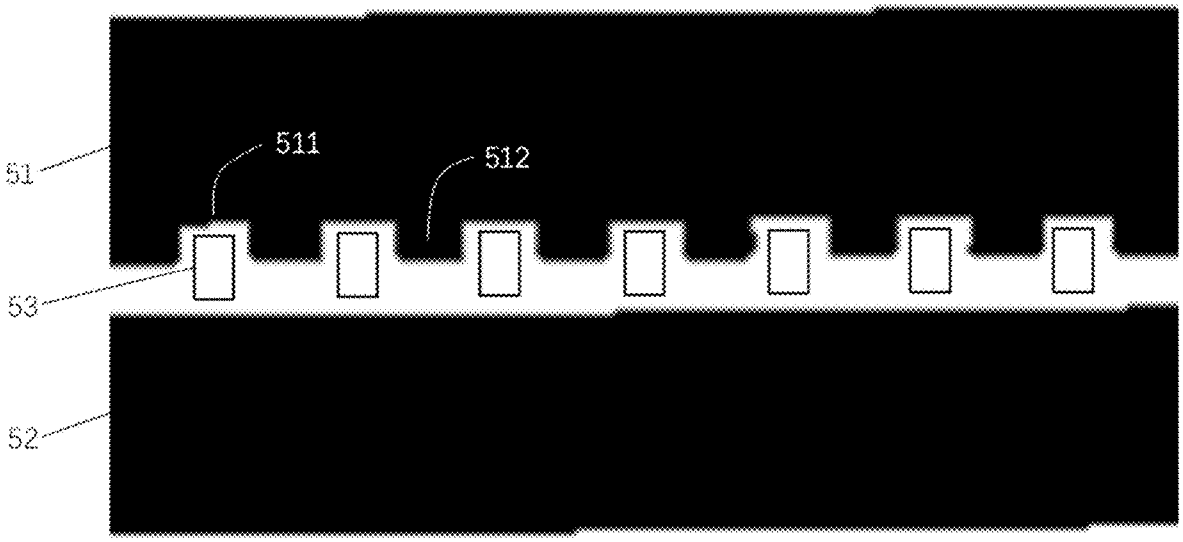

In some embodiments, as shown in FIG. 5, the first coupling section 51 of the first conductive trace may have a first perturbation structure. The first perturbation structure may be provided at the edge of the first coupling section 51 that is adjacent to the second coupling section 52 of the second conductive trace. In some embodiments, the first perturbation structure may include a first recess 511 provided at the edge of the first coupling section 51 adjacent to the second coupling section 52. In another embodiment, the first perturbation structure may include a plurality of first recesses 511 provided at the edge of the first coupling section 51 adjacent to the second coupling section 52. FIG. 5 illustrates the case where the first perturbation structure includes a plurality of first recesses 511. For example, the first perturbation structure may include a plurality of first recesses 511 and a plurality of first protrusions 512 that are alternately continuous and extend along the edge of the first coupling section 51 adjacent to the second coupling section 52.

The coupler according to these embodiments further includes at least one intermediate conductor 53. Each intermediate conductor 53 may be provided between the first perturbation structure of the first coupling section 51 and the second coupling section 52 and may be spaced apart from both the first coupling section 51 and the second coupling section 52 such that the intermediate conductor 53 is galvanically isolated from and coupled to both the first coupling section 51 and the second coupling section 52. In some embodiments in which the first perturbation structure includes only one first recess 511, a first intermediate conductor 53 may be provided at the first recess 511. In some embodiment, the coupler includes a plurality of intermediate conductors 53, and each of the plurality of intermediate conductors 53 may be provided at a respective one of the plurality of first recesses 511. For example, each intermediate conductor 53 may have a shape that corresponds to a shape of the respective first recess 511, and each intermediate conductor 53 may extend into the respective first recess 511 from the gap between the first coupling section 51 and the second coupling section 52, so as to be provided at least partially within the first recess 511. The distance between each intermediate conductor 53 and the first coupling section 51 may be not greater than (for example, may be less than) the distance between the first protrusion 512 and the second coupling section 52. The distance between the first intermediate conductor 53 and the second coupling section 52 may be not greater than (e.g., may be less than) the distance between the first protrusion 512 and the second coupling section 52.

In some embodiments, the perturbation structure may be provided on the coupling section of each of the two conductive traces of the coupler, but recesses in the perturbation structure of the first conductive trace and recesses in the perturbation structure of the second conductive trace may not be aligned with each other across the gap between the first coupling section and the second coupling section. In the description below, some description of content same or similar to the embodiments described above will be omitted in the interest of brevity.

Figure 6:
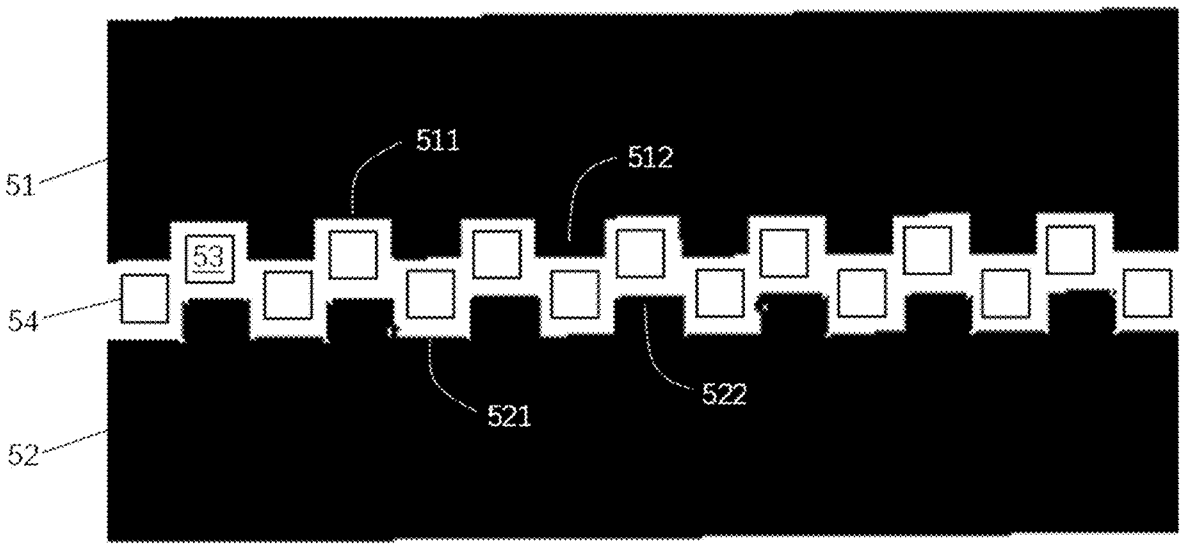

In some embodiments, as shown in FIG. 6, the first perturbation structure of the first coupling section 51 of the first conductive trace may include one or more first recesses 511. The second perturbation structure of the second coupling section 52 of the second conductive trace may include one or more second recesses 521. FIG. 6 illustrates the case in which the first perturbation structure includes a plurality of first recesses 511 and the second perturbation structure includes a plurality of second recesses 521. In such a case, the first perturbation structure may include a plurality of first recesses 511 and a plurality of first protrusions 512 that are alternately continuous and extend along the edge of the first coupling section 51 adjacent to the second coupling section 52, and the second perturbation structure may include a plurality of second recesses 521 and a plurality of second protrusions 522 that are alternately continuous and extend along an edge of the second coupling section 52 adjacent to the first coupling section 51. The plurality of first recesses 511 of the first perturbation structure may be staggered from the plurality of second recesses 521 of the second perturbation structure, and the plurality of first protrusions 512 may be staggered from the plurality of second protrusions 522. In the specific embodiment shown in FIG. 6, the plurality of first recesses 511 of the first perturbation structure are aligned substantially with the plurality of second protrusions 522 of the second perturbation structure. It should be understood that in some embodiments, the first recess 511 may not be substantially aligned with the second protrusion 522, and other arrangements in which the first recesses 511 and the second recesses 521 are staggered along a longitudinal or length direction of the conductive traces are provided herein.

As seen in FIG. 6, the coupler according to some embodiments may include a plurality of first intermediate conductors 53 and a plurality of second intermediate conductor 54. Each first intermediate conductor 53 and each second intermediate conductor 54 may be provided between the first perturbation structure of the first coupling section 51 and the second perturbation structure of the second coupling section 52, and may be spaced apart from both the first coupling section 51 and the second coupling section 52 such that the first intermediate conductors 53 and second intermediate conductors 54 are galvanically isolated from and coupled to both the first coupling section 51 and the second coupling section 52. There may be a plurality of first intermediate conductors 53, and each of the plurality of first intermediate conductors 53 may be at least partially within a respective one of the plurality of first recesses 511. For example, each first intermediate conductor 53 may have a shape that corresponds to a shape of the respective first recess 511, and the first intermediate conductor 53 may extend into the first recess 511 from the gap between the first coupling section 51 and the second coupling section 52, so as to be provided at least partially within the first recess 511. There may be a plurality of second intermediate conductors 54, and each of the plurality of second intermediate conductors 54 may be at least partially within a respective one of the plurality of second recesses 521. For example, each second intermediate conductor 54 may have a shape that corresponds to a shape of the respective second recess 521, and the second intermediate conductor 54 may extend into the second recess 521 from the gap between the first coupling section 51 and the second coupling section 52, so as to be provided at least partially within the second recess 521.

The distance between the first intermediate conductor 53 and the first coupling section 51 may be not greater than (for example, may be less than) the distance between the first protrusion 512 and the second protrusion 522 that is spaced in a direction perpendicular to the center line of the first conductive trace (for example, the center line CL of the first conductive trace 10 in FIG. 1) (hereinafter referred to as the distance between the first coupling section 51 and the second coupling section 52). The distance between the first intermediate conductor 53 and the second coupling section 52 may be not greater than (e.g., less than) the distance between the first coupling section 51 and the second coupling section 52. The distance between the second intermediate conductor 54 and the second coupling section 52 may be not greater than (e.g., may be less than) the distance between the first coupling section 51 and the second coupling section 52. The distance between the second intermediate conductor 54 and the first coupling section 51 may be not greater than (for example, may be less than) the distance between the first coupling section 51 and the second coupling section 52.

In some embodiments, the perturbation structure may be provided on the coupling section of each of the two conductive traces of the coupler, where the position of the perturbation structure of the first conductive trace and the position of the perturbation structure of the second conductive trace may be staggered in the length direction of the conductive trace. In the description below, some of the description of content same or similar to the embodiments described above will be omitted.

Figure 7:
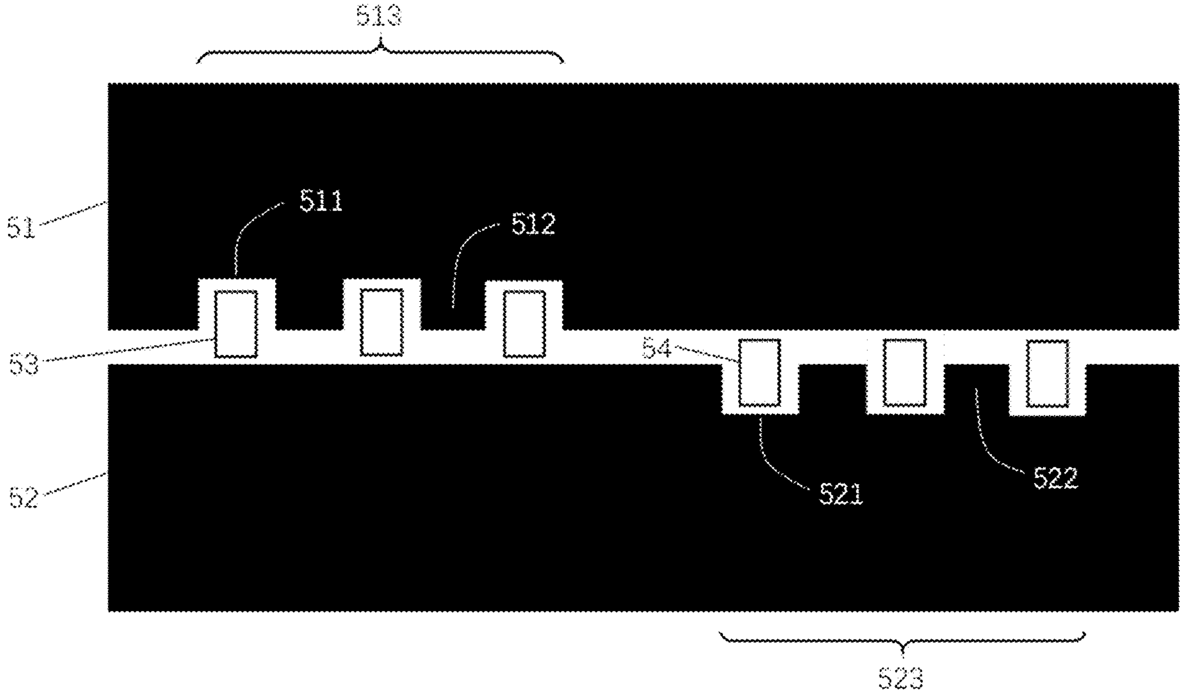

In some embodiments, as shown in FIG. 7, the first perturbation structure of the first coupling section 51 of the first conductive trace may be located in a first portion 513 of the first coupling section 51, and the second perturbation structure of the second coupling section 52 of the second conductive trace may be located in a second portion 523 of the second coupling section 52. The first portion 513 of the first coupling section 51 and the second portion 523 of the second coupling section 52 may be spaced apart from each other in a length or longitudinal direction of the coupler. The first perturbation structure may include one or more first recesses 511 and the second perturbation structure may include one or more second recesses 521. FIG. 7 illustrates a case in which the first perturbation structure includes a plurality of first recesses 511 and the second perturbation structure includes a plurality of second recesses 521. Each of a plurality of first intermediate conductors 53 may be provided at least partially within a respective one of the plurality of first recesses 511. Each of a plurality of second intermediate conductors 54 may be provided at least partially within a respective one of the plurality of second recesses 521. In some embodiments, the first portion 513 in which the first perturbation structure is located and the second portion 523 in which the second perturbation structure is located are staggered and thus not aligned in the length direction of the conductive trace, which may result in the first recess 511 of the first perturbation structure and the second recess 521 of the second perturbation structure also being staggered.

The distance between the first intermediate conductor 53 and the first coupling section 51 may be not greater than (for example, may be less than) the distance between the first protrusion 512 and the second coupling section 52. The distance between the first intermediate conductor 53 and the second coupling section 52 may be not greater than (e.g., may be less than) the distance between the first protrusion 512 and the second coupling section 52. The distance between the second intermediate conductor 54 and the second coupling section 52 may be not greater than (for example, may be less than) the distance between the first coupling section 51 and the second protrusion 522. The distance between the second intermediate conductor 54 and the first coupling section 51 may be not greater than (e.g., may be less than) the distance between the first coupling section 51 and the second protrusion 522.

Figure 8:
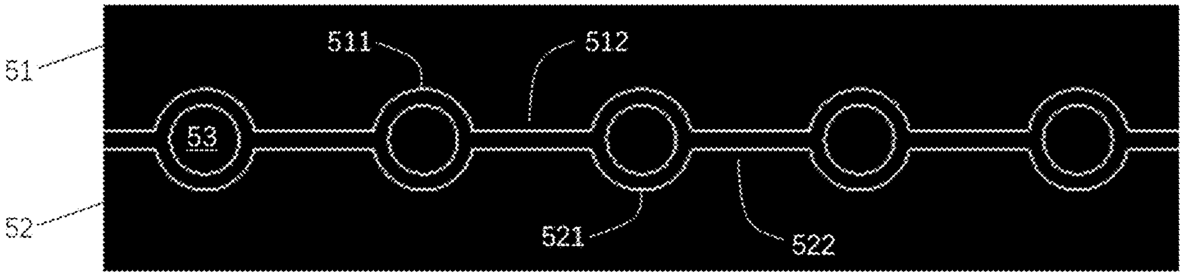

In the embodiments shown above, the intermediate conductors are rectangular in shape. It should be understood that the shape of the intermediate conductor is not limited, so long as may be received within a corresponding shape of the recess. For example, the intermediate conductor may be configured to have a shape of at least part of one of an arcuate shape, a circle shape, a rectangle shape, a triangle shape, a diamond shape, a cross shape, a T shape and an I shape. The shape of the recess into which the intermediate conductor is received may also be configured with a shape corresponding to the shape of the intermediate conductor. For example, FIG. 8 shows a coupling section of a coupler with an intermediate conductor having a circular shape, and a recess having an arcuate shape to fit with the circular intermediate conductor. Although not shown, those skilled in the art can obtain couplers with other shaped intermediate conductors and corresponding shaped recesses according to the contents of the present disclosure.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the scope of the present disclosure. Those skilled in the art should also understand that various modifications can be made to the embodiments without departing from the scope of the present disclosure. The scope of the present disclosure is defined by the attached claims.

What is claimed is:

1. A coupler, comprising:

a first conductive trace comprising a first coupling section;

a second conductive trace comprising a second coupling section that is adjacent to and galvanically isolated from the first coupling section; and an intermediate conductor provided between and galvanically isolated from the first coupling section and the second coupling section and coupled to both the first coupling section and the second coupling section, wherein an edge of the first coupling section that is adjacent to the second coupling section has a first recess, and the intermediate conductor is provided within the first recess.

2. The coupler according to claim 1, wherein the intermediate conductor and the first recess have corresponding shapes.

3. The coupler according to claim 2, wherein the intermediate conductor is configured to have a shape of at least one of an arcuate shape, a circle shape, a rectangle shape, a triangle shape, a diamond shape, a cross shape, a T shape or an I shape.

4. The coupler according to claim 1, wherein the first coupling section and the second coupling section are spaced by a first distance at a region other than the first recess, wherein the intermediate conductor is spaced by a second distance from the first coupling section and by a third distance from the second coupling section, and wherein the first distance is equal to or greater than the second distance and the third distance.

5. The coupler according to claim 1, wherein the intermediate conductor is a first intermediate conductor of a plurality of intermediate conductors, wherein the edge of the first coupling section adjacent to the second coupling section has a plurality of first recesses, and wherein each of the plurality of intermediate conductors is provided at least partially within a respective one the plurality of first recesses.

6. The coupler according to claim 1, wherein an edge of the second coupling section that is adjacent to the first coupling section has a second recess that is substantially aligned with the first recess, and wherein the intermediate conductor is provided at least partially within both the first recess and the second recess.

7. The coupler according to claim 6, wherein the intermediate conductor has a shape corresponding to a shape of the first recess and a shape of the second recess.

8. The coupler according to claim 7, wherein the shape of the intermediate conductor is one of an arcuate shape, a circle shape, a rectangle shape, a triangle shape, a diamond shape, a cross shape, a T shape or an I shape.

9. The coupler according to claim 6, wherein the first coupling section and the second coupling section are spaced by a first distance at a location other than at the first recess or the second recess, wherein the intermediate conductor is spaced by a second distance from the first coupling section and by a third distance from the second coupling section, and wherein the second distance and the third distance are less than or equal to the first distance.

10. The coupler according to claim 1, wherein the edge of the first coupling section that is adjacent to the second coupling section has a plurality of first recesses, wherein an edge of the second coupling section adjacent to the first coupling section has a plurality of second recesses, and wherein the intermediate conductor is a first intermediate conductor of a plurality of intermediate conductors, wherein each intermediate conductor of the plurality of intermediate conductors is provided at a respective first recess of the plurality of first recesses and a respective second recess of the plurality of second recesses.

11. The coupler according to claim 1, wherein the intermediate conductor is a first intermediate conductor, the coupler further comprising:

a second intermediate conductor provided between the first coupling section and the second coupling section and galvanically isolated from and coupled to both the first coupling section and the second coupling section, wherein an edge of the second coupling section adjacent to the first coupling section has a second recess that is staggered from the first recess, and the second intermediate conductor is provided at the second recess.

12. The coupler according to claim 11, wherein the first coupling section and the second coupling section are spaced by a first distance at a location other than the first recess or the second recess, wherein the second intermediate conductor is spaced by a second distance from the first coupling section and by a third distance from the second coupling section, and wherein the second distance and the third distance are less than or equal to the first distance.

13. The coupler according to claim 11, wherein the edge of the second coupling section that is adjacent to the first coupling section has a plurality of second recesses, wherein the coupler comprises a plurality of second intermediate conductors, and wherein the plurality of second intermediate conductors are respectively provided at the plurality of second recesses.

14. The coupler according to claim 1, wherein the first conductive trace and the second conductive trace are configured as strip conductors in a microstrip transmission line.

15. A coupler, comprising:

a first conductive trace comprising a first coupling section;

a second conductive trace comprising a second coupling section that is galvanically isolated from and coupled to the first coupling section; and an intermediate conductor provided between the first coupling section and the second coupling section, the intermediate conductor galvanically isolated from and coupled to both the first coupling section and the second coupling section, wherein the first coupling section has a first perturbation structure configured to slow down a phase speed of a first radiofrequency signal transmitted in the first conductive trace, and configured to slow down a phase speed of odd-mode excitation signals on the first conductive trace and the second conductive trace more than even-mode excitation signals on the first conductive trace and the second conductive trace; and wherein the intermediate conductor is between the first perturbation structure and the second coupling section.

16. The coupler according to claim 15, wherein the first perturbation structure comprises a plurality of first protrusions and a plurality of first recesses that alternate an edge of the first coupling section adjacent to the second coupling section.

17. The coupler according to claim 16, wherein the intermediate conductor is provided in within a first recess of the plurality of first recesses.

18. The coupler according to claim 17, wherein the intermediate conductor is a first intermediate conductor of a plurality of intermediate conductors, each intermediate conductor within a corresponding recess of the plurality of first recesses.

19. The coupler according to claim 17, wherein at least one first protrusion of the plurality of first protrusions is spaced by a first distance from the second coupling section, wherein the intermediate conductor is spaced by a second distance from the first coupling section and by a third distance from the second coupling section, and wherein the second distance and the third distance are less than or equal to the first distance.

20. The coupler according to claim 15, wherein the second coupling section has a second perturbation structure configured to slow down a phase speed of a second RF signal transmitted in the second conductive trace; and wherein the intermediate conductor is provided between the first perturbation structure and the second perturbation structure.

* * * * *